US012057626B2

(12) United States Patent
Brinlee et al.

(10) Patent No.: US 12,057,626 B2
(45) Date of Patent: Aug. 6, 2024

(54) PLANAR BROAD-BAND TRANSMITTER

(71) Applicant: Garrity Power Services LLC, Rockwall, TX (US)

(72) Inventors: Antony Brinlee, Plano, TX (US); Paul Garrity, Rockwall, TX (US)

(73) Assignee: Garrity Power Services LLC, Rockwall, TX (US)

( * ) Notice: Subject to any disclaimer, the term of this patent is extended or adjusted under 35 U.S.C. 154(b) by 255 days.

(21) Appl. No.: 17/856,174

(22) Filed: Jul. 1, 2022

(65) Prior Publication Data

US 2024/0006747 A1 Jan. 4, 2024

(51) Int. Cl.

| | |
|---|---|
| ***H01Q 9/27*** | (2006.01) |
| ***H01Q 1/36*** | (2006.01) |
| ***H01Q 1/48*** | (2006.01) |
| ***H01Q 9/04*** | (2006.01) |

(52) U.S. Cl.
CPC ................. *H01Q 1/36* (2013.01); *H01Q 1/48* (2013.01); *H01Q 9/0407* (2013.01)

(58) Field of Classification Search
CPC ......... H01Q 9/0407; H01Q 9/27; H01Q 21/28
See application file for complete search history.

(56) References Cited

U.S. PATENT DOCUMENTS

| | | | | | |
|---|---|---|---|---|---|
| 5,313,216 | A * | 5/1994 | Wang | H01Q 1/38 343/895 |
| 7,639,183 | B2 * | 12/2009 | Teshirogi | H01Q 13/06 343/895 |
| 7,791,415 | B2 | 9/2010 | Hornbuckle | |
| 7,889,151 | B1 * | 2/2011 | Brock | H01Q 9/27 343/895 |
| 2011/0254755 | A1 * | 10/2011 | DiNallo | H01Q 11/08 343/893 |
| 2016/0104933 | A1 * | 4/2016 | Coupez | H01Q 1/36 343/700 MS |
| 2018/0212318 | A1 * | 7/2018 | Balanis | H01Q 1/48 |
| 2020/0014121 | A1 * | 1/2020 | Maccabe | H01Q 15/24 |
| 2020/0203835 | A1 * | 6/2020 | Wu | H01Q 9/27 |
| 2020/0395655 | A1 * | 12/2020 | Howarth | H01Q 9/28 |

* cited by examiner

*Primary Examiner* — Awat M Salih
(74) *Attorney, Agent, or Firm* — Scott R. Brown; Hovey Williams LLP

(57) ABSTRACT

A transmitter comprising a planar antenna including a ground plane and first and second spiral radiating elements wrapping around the ground plane, and a driving circuit. Proximal ends of the spiral radiating elements terminate near points located along a perimeter of the ground plane. Exactly one of the first and second spiral radiating elements are electrically isolated from the ground plane. The first and second spiral radiating elements are wound in the same direction for approximately a single turn and increase in thickness for approximately three-fourths of the turn. The driving circuit drives one of the first and second spiral radiating elements.

16 Claims, 7 Drawing Sheets

| Marker | Freq. (Hz) | RL (dB) | RP (°) | \|Z\| () | Rs () | Xs () | Theta | SWR |
|---|---|---|---|---|---|---|---|---|
| 1 | 779,285,872 | -13.55 | -84.24 | 52.1 | 47.7 | -20.9 | -23.6 | 1.53:1 |
| 2 | 867,987,676 | -15.76 | 131.23 | 40.4 | 39.2 | 9.9 | 14.1 | 1.39:1 |
| 1-2 | 88,701,804 | 2.21 | 215.47 | 11.6 | 8.5 | 30.7 | 0.0 | --- |
| 3 | 928,764,838 | -8.85 | 46.44 | 80.2 | 68.7 | 41.3 | 31.0 | 2.13:1 |

FIGURE 7

PLANAR BROAD-BAND TRANSMITTER

BACKGROUND

Many types of sensors require a remote connection to the internet to compile data and allow for remote monitoring. Long range radio technology (e.g., LoRa® radio technology) is a relatively recent development that allows connection of remote sensors to the internet because of its ability to transmit at distances of over 1 km using adequately reduced power levels that enable battery-operated sensors to operate for months or longer without a battery change. Long range radio technology as described in U.S. Pat. No. 7,791,415, incorporated by reference in its entirety herein, uses a fractional-N phase-locked-loop to allow a modulated frequency that differs in up-frequency rate from down-frequency rate with great accuracy, thus allowing much longer range and lower power usage than standard transmission technology.

Long range radio technology switches between a number of channels when transmitting in order to decrease the possibility of data collisions with nearby long range radio transmitters. The number of channels required depends on the number of nearby transmitters and the rate at which the transmitters transmit information. The range of frequencies over which a transmitter is required to transmit information may comprise, for example, a 2:1 ratio.

Many antenna designs are optimized for use at a single frequency or a very small band of frequencies around a center frequency. Such antennas are poorly adapted for use with long range radio technology since most long range radio applications must transmit at a multitude of channels and therefore require a large frequency range.

Applications that can benefit from long range radio technology often require very compact transmitters. For example, tags on animals or inventory items may need to be flat, light, and small. Such applications also require a built-in power source such as a battery or a super capacitor. These applications therefore need to use a compact combination of a power source, an antenna, and a driver that operates over a wide frequency range.

Planar spiral antennas such as log-periodic spiral antennas and Archimedean Spiral Antennas are well-known as a means to achieve very large bandwidth in a planar antenna. Spiral antennas employ two radiating elements that wrap around each other in a spiral pattern which terminates at a point in the center of the two spirals. In order to achieve very high bandwidth, spiral antennas often reside in a stand-alone plane. Driving circuits and power sources must be located outside of the immediate vicinity of the plane of a traditional spiral antenna and connect to the center of the antenna through a coaxial cable. Otherwise, the ground plane of the driving circuit or the large surface area of the battery may interfere with transmission. A traditional complete circuit that includes a spiral antenna and a driver thus requires a relatively large volume and is poorly suited to many long range radio applications.

SUMMARY OF THE INVENTION

The present invention solves the above-described problems and provides a distinct advance to compact circuits appropriate for use in applications that employ long range radio transmitters. Specifically, the present invention includes a transmitter comprising a planar antenna that includes a centralized ground plane and first and second spiral radiating elements which wrap around the centralized ground plane and are composed of a first conducting material. A proximal end of the first spiral radiating element terminates near (at or in the vicinity of), but may be electrically isolated from, a first termination point located along the perimeter/circumference of the centralized ground plane. A proximal end of the second spiral radiating element terminates near, but may be electrically isolated from, a second termination point located along the perimeter/circumference of the centralized ground plane. The first termination point and second termination point may be 180 degrees apart from each other on (e.g. on opposite sides of) the centralized ground plane.

Exactly one of the proximal end of the first spiral radiating element and the proximal end of the second spiral radiating element may be electrically isolated from the centralized ground plane. The first and second spiral radiating elements may be wound in the same direction (either both clockwise or both anti-clockwise) around the centralized ground plane. The first and second spiral radiating elements each circle the centralized ground plane approximately a single turn (e.g., between 0.9 and 1.1 turns). The first and second spiral radiating elements may increase in width for at least ¾ths of a turn (i.e., at least 270 degrees) from their proximal ends.

The transmitter may also comprise a driving circuit configured to drive one of the first and second spiral radiating elements. In another embodiment, the transmitter may further comprise a planar battery configured to be confined within a horizontal footprint of the centralized ground plane and further configured to be affixed directly or indirectly to the centralized ground plane and provide electrical power to the driving circuit.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein:

FIG. 7 is a table of data corresponding to the graphical plot of FIG. 6.

Figure 1:
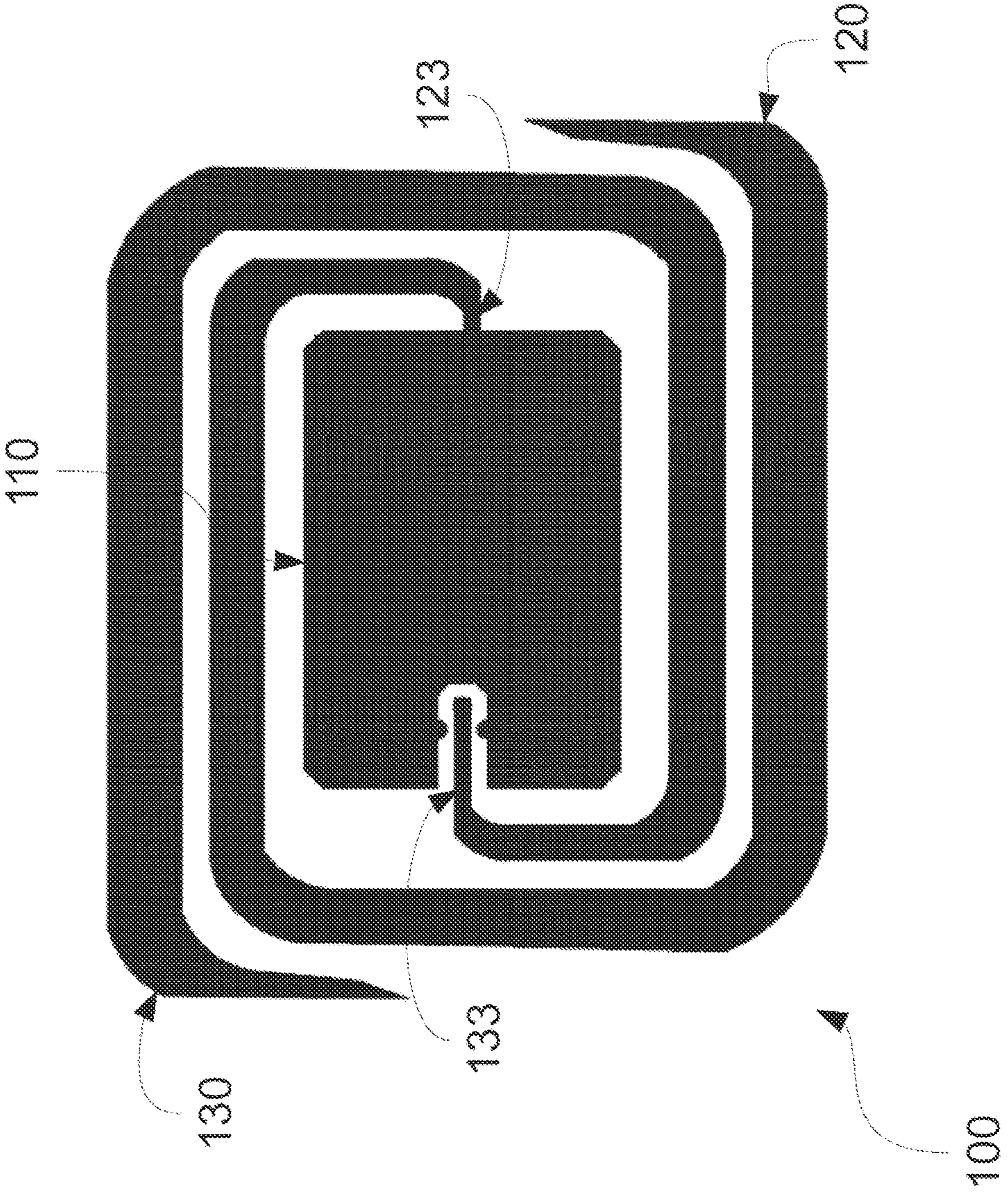
FIG. 1 is a plan view of a transmitter comprising an antenna constructed in accordance with an embodiment of the invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integration of the embodiments described herein.

Figure 2:
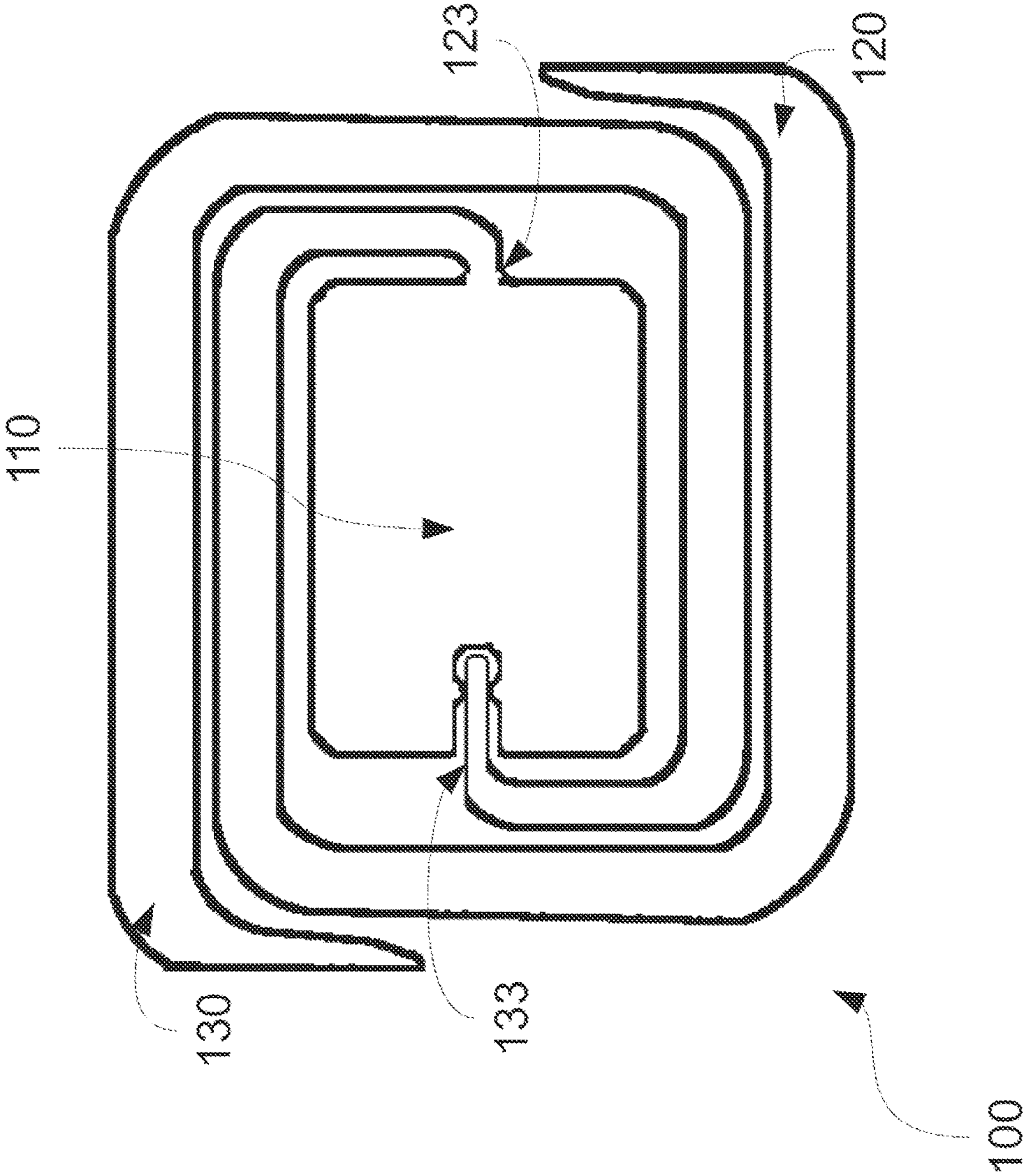
FIG. 2 is an outline plan view of the transmitter of FIG. 1.

A plan view of an embodiment of Transmitter 100 is shown in FIGS. 1 and 2. FIG. 1 and FIG. 2 show the same embodiment, except that the drawing in FIG. 1 depicts conductive material (such as copper) in solidly filled areas and FIG. 2 is a line drawing depicting boundaries between conducting and non-conducting material. Transmitter 100 comprises an Antenna 105 including Radiating Elements 120 and 130 and Ground Plane 110. In some embodiments, the Ground Plane 110 may be in the shape of a rectangle in which the corners have been trimmed or rounded, an oval, or a circle.

Radiating Element 120 terminates via its proximal end near (at or in the vicinity of) First Termination Point 123 of Ground Plane 110. Radiating Element 130 terminates via its proximal end near Second Termination Point 133 of Ground Plane 110. As can be seen from FIGS. 1 and 2, the termination near First Termination Point 123 comprises an electrically conductive material whereas the termination near Second Termination Point 133 is non-conducting—that is, Radiating Element 120 is electrically connected to Ground Plane 110 while Radiating Element 130 is not electrically connected to Ground Plane 110. Note that Ground Plane 110 is depicted as a solid region in FIG. 1; however, in some embodiments Ground Plane 110 is not entirely solid. For example, Ground Plane 110 may be the ground plane of a multi-layer circuit board, and thus may have small cut-outs coinciding with through-holes, vias, and circuit board traces.

In one embodiment such as the one shown in FIGS. 1 and 2, at least one of Radiating Elements 120 and 130 terminates at Ground Plane 110 without making a physical electrical connection to Ground Plane 110. The non-electrical termination can be accomplished by a number of means. For example, the non-electrical termination can be accomplished by removing a thin sliver of conducting material around the radiating element (resulting in the structure shown in FIGS. 1 and 2), or it can be accomplished by offsetting the radiating element from the plane of Ground Plane 110 and placing an insulating material (such as standard circuit board material) between the radiating element and Ground Plane 110. Furthermore, in another embodiment, either or both of Radiating Elements 120 and 130 may be non-permanently electrically disconnected from Ground Plane 110. For example, each of Radiating Elements 120 and 130 can terminate at Ground Plane 110 via switches (such as Switches 208 and 210 described below and shown in FIG. 5) such that the switches alternately electrically connect Radiating Elements 120 and 130 to (and isolate the other radiating element from) Ground Plane 110. Importantly, at any given time, exactly one of Radiating Elements 120 and 130 is electrically coupled to Ground Plane 110.

Radiating Elements 120 and 130 wrap around each other as well as wrap around Ground Plane 110. As can be seen in FIGS. 1 and 2, Radiating Elements 120 and 130 form spirals in an anti-clockwise direction. Radiating Elements 120 and 130 could also form spirals in a clockwise direction rather than an anti-clockwise direction. What is important is that Radiating Elements 120 and 130 wrap around Ground Plane 110 and wrap around each other in the same direction.

Radiating Elements 120 and 130 each form spirals of approximately one turn (e.g., between 0.9 and 1.1 turns). The exact number of turns may be adjusted from exactly one turn due to the difference between the speed of electricity in the conducting material that forms Radiating Elements 120 and 130 (e.g. copper) and the speed of light, as well as adjustments necessary due to capacitance of nearby structures in the enclosure of the Antenna 105.

As shown in FIGS. 1 and 2, Radiating Elements 120 and 130 may increase in width as they spiral out from Ground Plane 110. The lower or lowest frequency in the transmitting frequency range of the Transmitter 100 is determined by the outside perimeter of the Radiating Elements 120 and 130 and the upper or uppermost frequency in the transmitting frequency range of the Transmitter 100 is determined by the inside perimeter of the Radiating Elements 120 and 130. It is therefore critical in certain embodiments that the width of the Radiating Elements 120 and 130 increase as the radiating elements 120 and 130 spiral outward from Ground Plane 110 in order to yield a large operating frequency range. The outer terminations of Radiating Elements 120 and 130 may not be able to support a large width due to space constraints on the Antenna 105. It is adequate for the width of the Radiating Elements 120 and 130 to increase for approximately ¾ths of a turn (i.e., approximately 270 degrees of rotation) beginning at the proximal ends spiraling out from the centralized Ground Plane 110 as shown in FIGS. 1 and 2.

Figure 3:
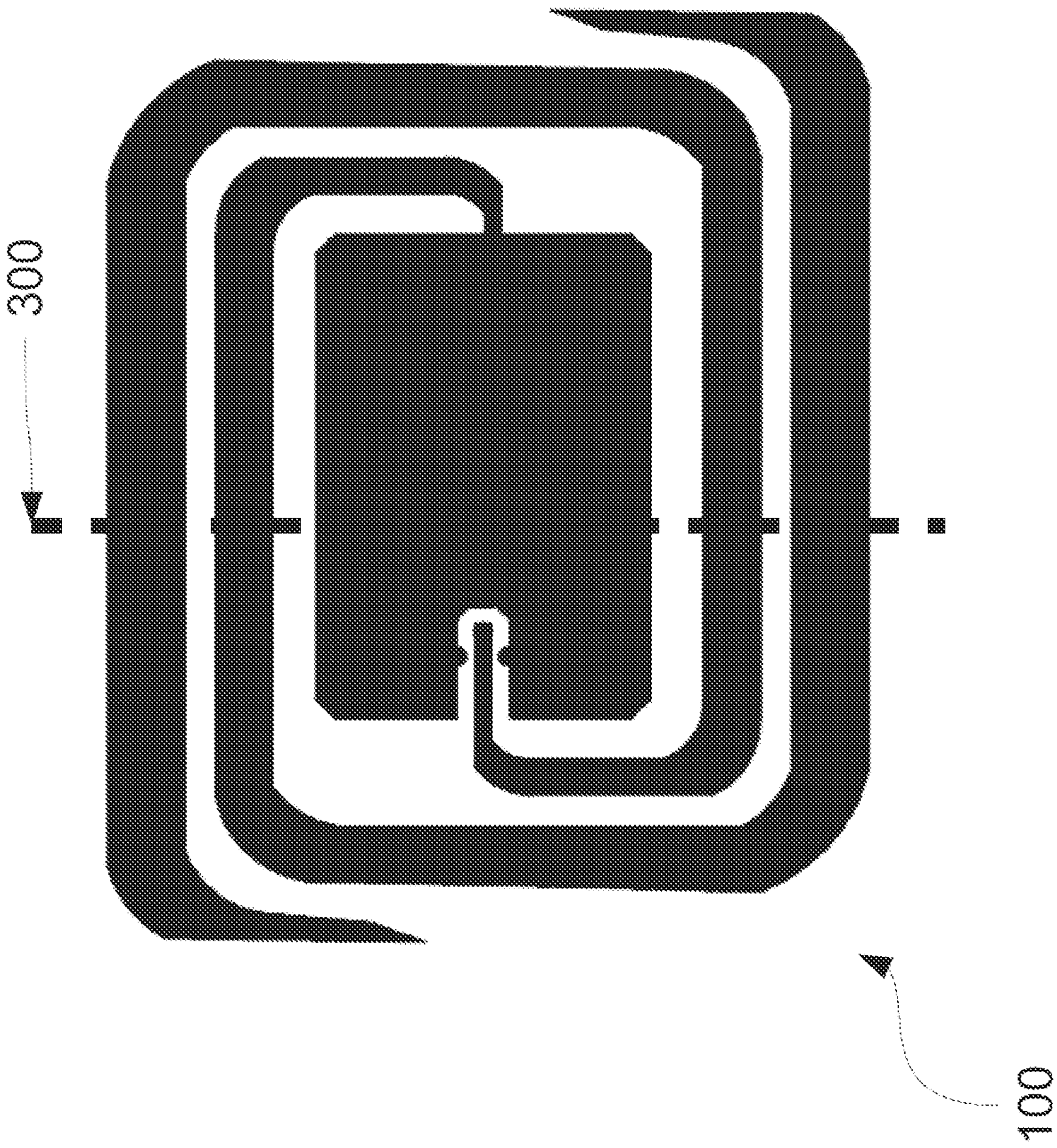
FIG. 3 is a plan view of the transmitter of FIG. 1 including a cross section view line.
Figure 4:
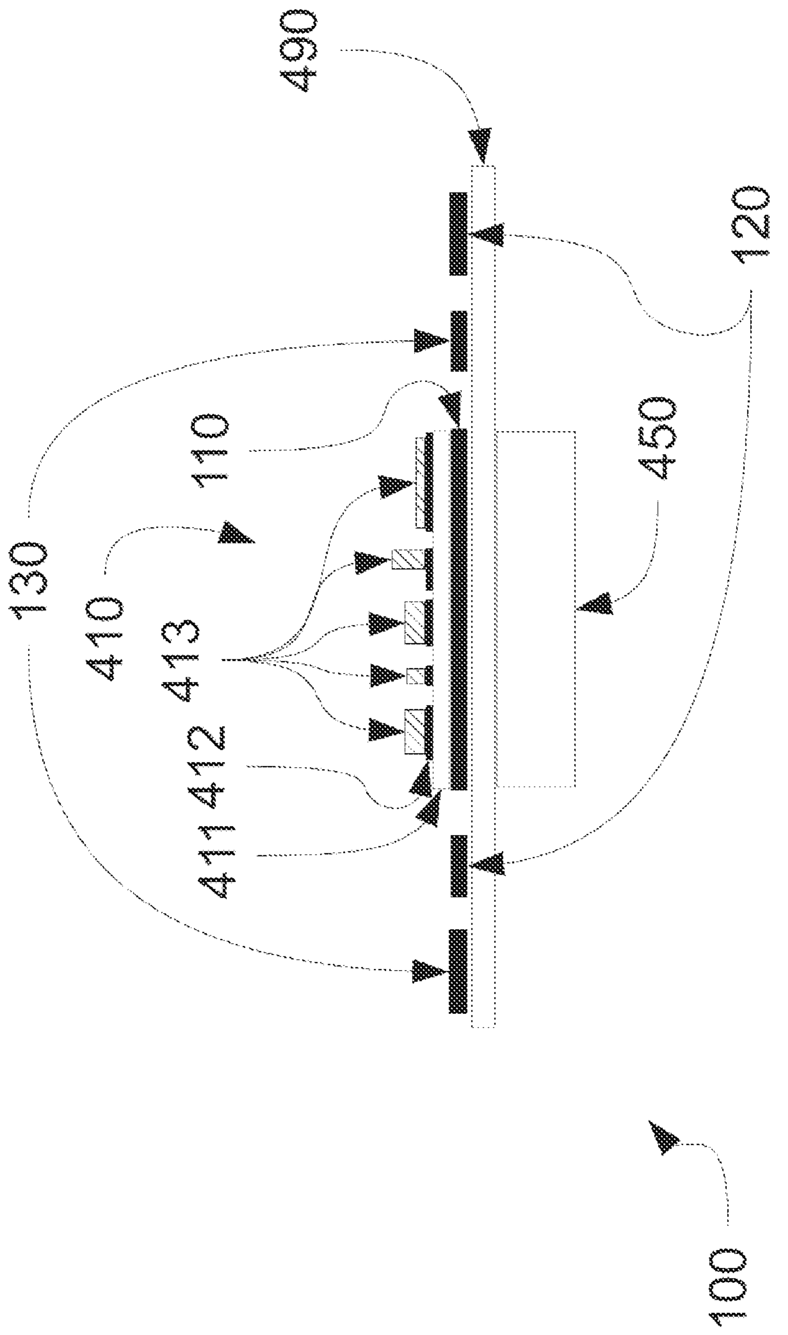
FIG. 4 is an elevation view of the transmitter through the cross section view line of FIG. 3.

Turning now to FIGS. 3 and 4, FIG. 3 shows the same plan view embodiment of Transmitter 100 as FIGS. 1 and 2, except that FIG. 3 includes dotted line 300 which defines a vertical cross-section of the Transmitter 100 that is shown in FIG. 4.

As best seen in FIG. 4, a Driving Circuit 410 configured to drive Radiating Elements 120 and 130 is located on top of Ground Plane 110. Ground Plane 110 may form an integral part of a two or more layer printed circuit board integral to the Driving Circuit 410.

Insulator 490 may be the insulation material of a printed circuit board. A copper layer above Insulator 490 comprises Radiating Elements 120 and 130 as well as Ground Plane 110. The copper layer comprising Radiating Elements 120 and 130 corresponds to the solid regions shown in FIG. 3, which are intersected by dotted line 300.

Insulator 411 is located above Ground Plane 110. Insulator 411 may be the insulation material of a printed circuit board such as FR-4 material. Conducting layer 412 is located above Insulator 411. Conducting Layer 412 may be an etched layer of copper forming printed circuit board pads on which electronic components are soldered as well as copper traces forming connections between pins of the electronic components.

Component Layer 413 comprises electronic components which may be soldered to appropriate places on Conducting Layer 412. Note that while Ground Plane 110 is depicted as a solid region of copper, small areas of Ground Plane 110 may be etched away to allow, for example, placement of electrical traces for the purpose of completing electrical circuits, and while Insulator 411 is depicted as a solid insulator, small electrical vertical runs of copper may be placed within Insulator 411, for example, for the purpose of electrically connecting various pins from Components Layer 413 to Ground Plane 110.

Driving Circuit 410 comprises the components in Component Layer 413 in tandem with Conducting Layer 412, Insulator 411, and Ground Plane 110 and is configured to drive the Antenna 105 which comprises Radiating Arms 120 and 130 and Ground Plane 110. More specifically, Driving Circuit 410 drives whichever one of Radiating Arms 120 and 130 is not electrically coupled to Ground Plane 110. What is presented in FIG. 4 is thus a planar transmitter configured to operate over a broad range of frequencies.

FIG. 4 also shows Planar Battery 450 under Insulator 490. Planar Battery 450 is configured to be electrically coupled to and power the Driving Circuit 410 that is formed by the components in Component Layer 413 through small vertical wires which may comprise vertical copper traces within Insulators 411 and 490. Planar Battery 450 may be further configured to be confined within a horizontal footprint of Ground Plane 110.

Figure 5:
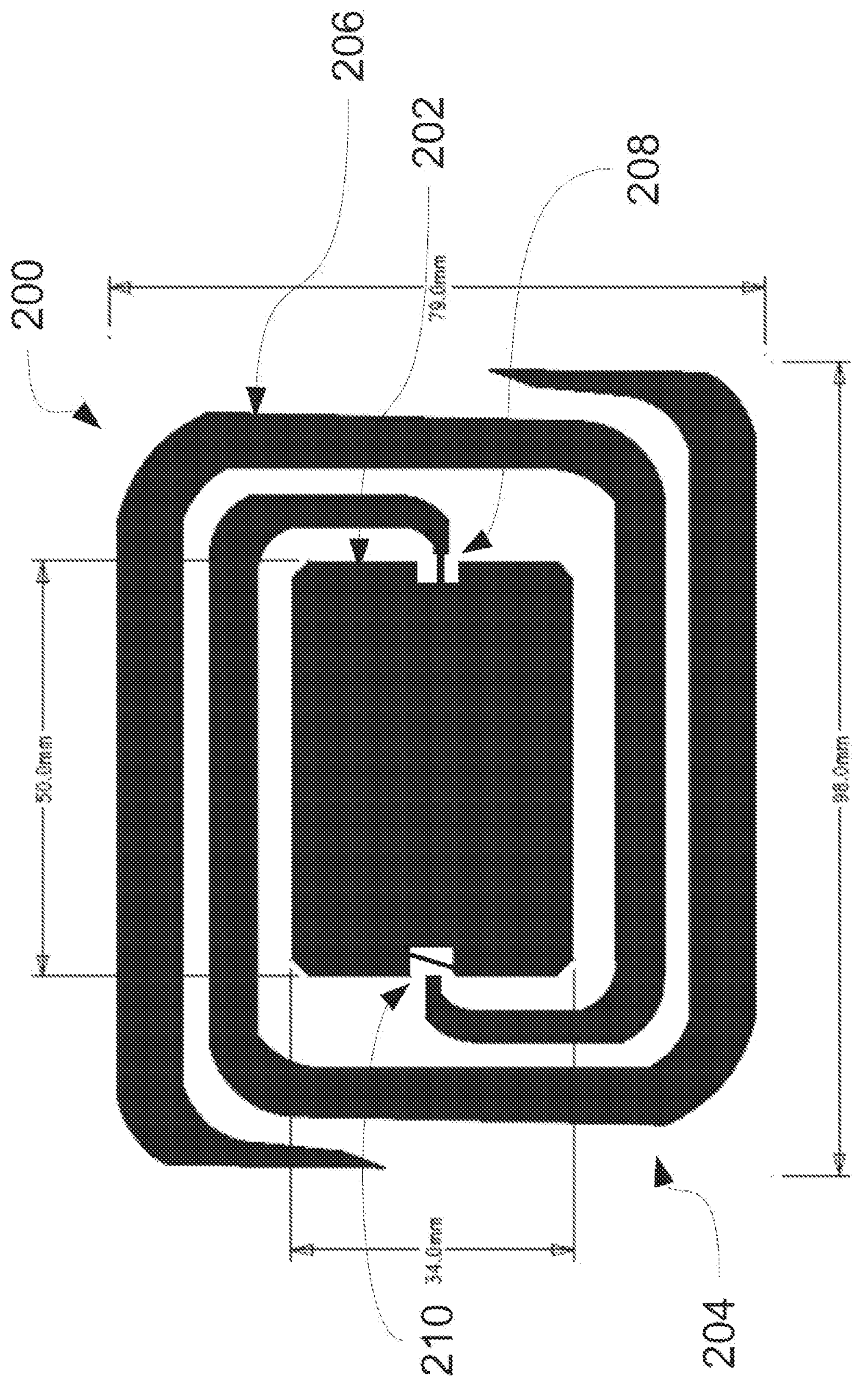
FIG. 5 is a plan view of a transmitter constructed in accordance with another embodiment of the invention.

FIG. 5 shows typical dimensions of an exemplary embodiment of a broadband Transmitter 200 configured to transmit signals according to a LoRaWAN standard. The overall length of transmitter is 98 mm and the overall width is 79 mm. The height of the Transmitter 200 may be about 10 mm without a battery, or 13 mm with a battery. The Transmitter 200 also includes switches 208 and 210 that alternately electrically connect Radiating Elements 204 and 206 to Ground Plane 202. Importantly, at any given time, exactly one of Radiating Elements 204 and 206 is electrically coupled to Ground Plane 202, and the other radiating element is not electrically coupled to Ground Plane. Note that Switches 208 and 210 are shown schematically and may be any suitable electronic or electrical switches.

Figure 6:
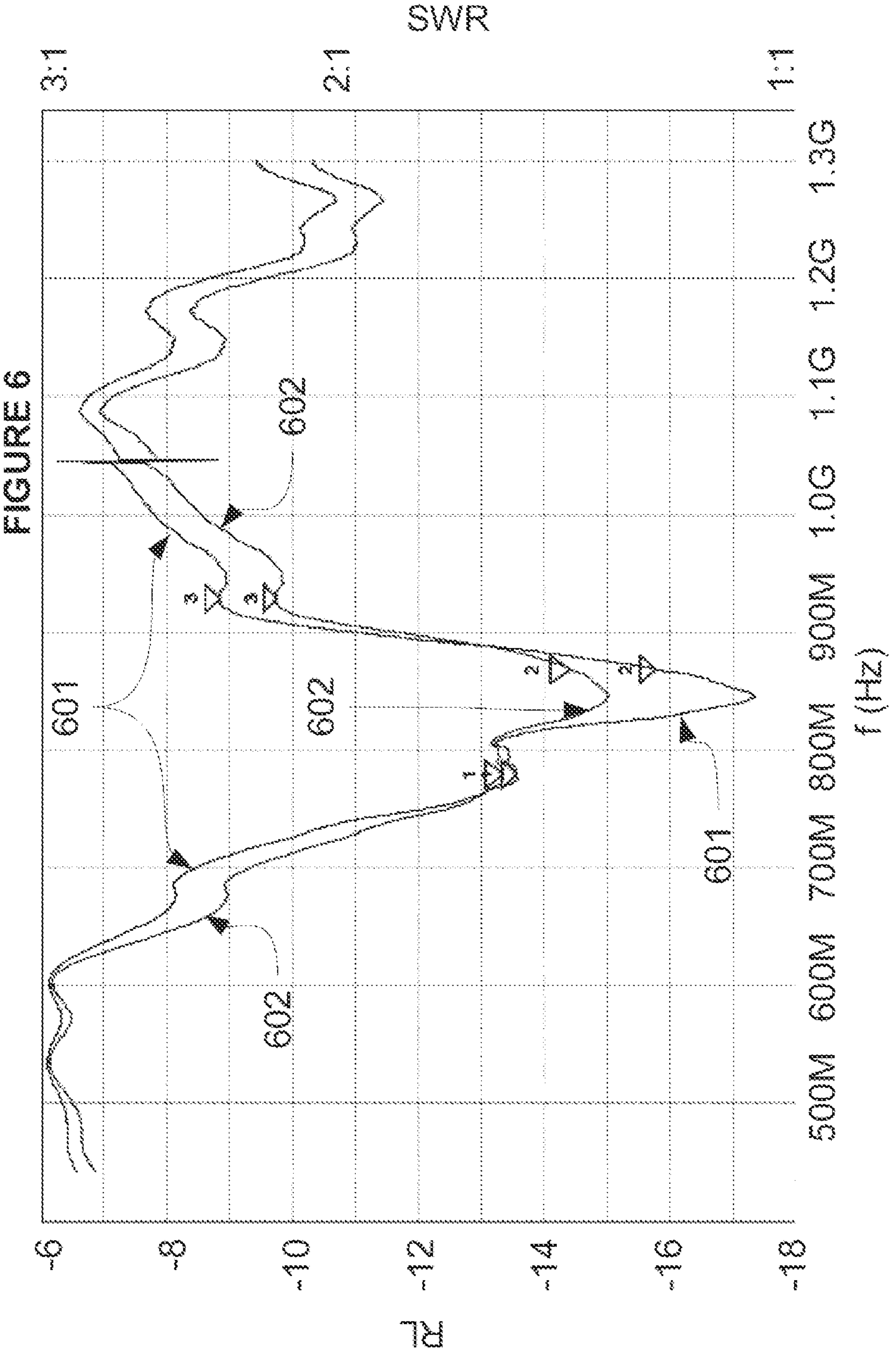
FIG. 6 is a graphical plot of the performance of a transmitter in accordance with an embodiment of the invention.

FIG. 6 shows a plot of return loss (RL) and standing wave ratio (SWR) of the embodiment in FIG. 5 over a range of frequencies, and FIG. 7 shows a table of some data points in the plot of FIG. 6. Curve 601 is the return loss and Curve 602 is the standing wave ratio. Results show that the embodiment in FIG. 5 demonstrates good performance in a range of frequencies from 779 MHz to 929 MHz, which is a range of frequencies appropriate for long range radio applications.

Although the present invention and its advantages have been described in detail, it should be understood that various changes, substitutions, and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Having thus described one or more embodiments of the invention, what is claimed as new and desired to be protected by Letters Patent includes the following:

What is claimed:

1. A transmitter comprising:

a planar antenna including:

a centralized ground plane defining opposing first and second termination points; and first and second spiral radiating elements wrapping around the centralized ground plane and composed of a conducting material, each of the first and second spiral radiating elements including a proximal end such that:

a. the proximal end of the first spiral radiating element terminates near the first termination point of the centralized ground plane;

b. the proximal end of the second spiral radiating element terminates near the second termination point of the centralized ground plane;

c. the first and second spiral radiating elements spiral in the same direction around the centralized ground plane;

d. exactly one of the proximal end of the first spiral radiating element and the proximal end of the second spiral radiating element is electrically isolated from the centralized ground plane; and e. each of the first and second spiral radiating elements encircle the centralized ground plane between approximately 0.9 and 1.1 turns.

2. The transmitter of claim 1, the first and second spiral radiating elements increasing in width for approximately ¾ths of a turn from their proximal ends.

3. The transmitter of claim 1, excepting near the proximal ends of the first and second spiral radiating elements, each of a distance between the centralized ground plane and the first spiral radiating element and a distance between the centralized ground plane and the second spiral radiating element being equal to or greater than a minimum transmitting wavelength of the transmitter divided by 200.

4. The transmitter of claim 1, the transmitter further comprising a driving circuit configured to drive one of the first and second spiral radiating elements.

5. The transmitter of claim 1, further comprising a planar battery confined within a horizontal footprint of the centralized ground plane and configured to provide electrical power to the driving circuit.

6. The transmitter of claim 1, the centralized ground plane including a notch near the second termination point such that the proximal end of the second spiral radiating element is electrically isolated from the second termination point.

7. The transmitter of claim 1, further comprising a layer of insulation, the proximal end of the second spiral radiating element and the centralized ground plane being in different parallel geometric planes such that the proximal end of the second spiral radiating element is electrically isolated from the second termination point via the layer of insulation.

8. The transmitter of claim 1, further comprising first and second switches configured to be alternately closed and opened, the proximal end of the first spiral radiating element being configured to be electrically coupled to the centralized ground plane at the first termination point via the first switch and the proximal end of the second spiral radiating element being configured to be electrically coupled to the second termination point via the second switch.

9. The transmitter of claim 8, the driving circuit being configured to alternately drive the first and second spiral radiating elements via the first and second switches.

10. The transmitter of claim 1, the centralized ground plane having one of a circle shape and an oval shape.

11. The transmitter of claim 1, the centralized ground plane having a rectangular shape including rounded or trimmed corners.

12. A transmitter comprising:

a planar antenna including:

a centralized ground plane defining opposing first and second termination points;

first and second spiral radiating elements wrapping around the centralized ground plane and composed of a conducting material, each of the first and second spiral radiating elements including a proximal end such that:

a. the proximal end of the first spiral radiating element terminates near the first termination point of the centralized ground plane;

b. the proximal end of the second spiral radiating element terminates near the second termination point of the centralized ground plane;

c. the first and second spiral radiating elements spiral in the same direction around the centralized ground plane; and d. each of the first and second spiral radiating elements encircle the centralized ground plane between approximately 0.9 and 1.1 turns;

a planar battery configured to provide electrical power to the driving circuit, the planar battery being confined within a horizontal footprint of the centralized ground plane; and a driving circuit configured to drive the spiral radiating element electrically isolated from the centralized ground plane.

13. The transmitter of claim 12, the first and second spiral radiating elements increasing in width for approximately ¾ths of a turn from their proximal ends.

14. The transmitter of claim 12, excepting near the proximal ends of the first and second spiral radiating elements, each of a distance between the centralized ground plane and the first spiral radiating element and a distance between the centralized ground plane and the second spiral radiating element being equal to or greater than a minimum transmitting wavelength of the transmitter divided by 200.

15. The transmitter of claim 12, the centralized ground plane having a rectangular shape including rounded or trimmed corners.

16. A transmitter comprising:

a planar antenna including:

a centralized ground plane having a rectangular shape including rounded or trimmed corners and defining opposing first and second termination points;

first and second spiral radiating elements wrapping around the centralized ground plane and composed of a conducting material, each of the first and second spiral radiating elements including a proximal end such that:

a. the proximal end of the first spiral radiating element terminates near the first termination point of the centralized ground plane;

b. the proximal end of the second spiral radiating element terminates near the second termination point of the centralized ground plane;

c. the first and second spiral radiating elements spiral in the same direction around the centralized ground plane;

d. each of the first and second spiral radiating elements encircle the centralized ground plane between approximately 0.9 and 1.1 turns; and e. the first and second spiral radiating elements increase in width for approximately ¾ths of a turn from their proximal ends;

a planar battery configured to provide electrical power to a driving circuit, the planar battery being confined within a horizontal footprint of the centralized ground plane; and the driving circuit configured to drive the spiral radiating element electrically isolated from the centralized ground plane.

* * * * *